UNITED STATES PATENT OFFICE.

THOMAS A. EDISON, OF LLEWELLYN PARK, NEW JERSEY, ASSIGNOR TO THE EDISON PHONOGRAPH COMPANY, OF NEW JERSEY.

PROCESS OF MAKING PHONOGRAM-BLANKS.

SPECIFICATION forming part of Letters Patent No. 393,462, dated November 27, 1888.

Application filed May 7, 1888. Serial No. 273,038. (No specimens.)

*To all whom it may concern:*

Be it known that I, THOMAS A. EDISON, a citizen of the United States, residing at Llewellyn Park, in the county of Essex and State of New Jersey, have invented a certain new and useful Improvement in Processes of Making Phonogram-Blanks, (Case No. 768;) of which the following is a specification.

As has been made known by my prior applications for patents, the phonogram-blank which I prefer to employ is one made entirely of wax or a wax composition in the form of a cylinder having a cylindrical outer surface and a tapering bore. These blanks I mold from the wax composition, as described in prior applications; but the excessive contraction of the wax in cooling makes it impossible to give such blanks by molding the precise size externally and internally that they should have for use upon my phonograph. I have attempted to reduce these molded blanks to the exact size for use both by pressing them in a finishing-die and also by cutting them both externally and internally with proper tools. These methods of finishing the blanks have, however, objections, which it is the object of my present invention to overcome.

By my present invention I first mold the blank from the wax composition, making it slightly larger than the finished blank, and I then finish the blank by cutting it both externally and internally with heated knives or cutters. These knives or cutters are suitably heated to a temperature slightly below the melting-point of the wax composition; but the rapidity of the cutting operation is such that the wax body of the blank does not melt. For the heated cutting-tools I employ, first, a tapering reamer, which is heated by the introduction of steam into its hollow body and is revolved rapidly. The molded blank is pushed onto this reamer and withdrawn from it by a continuous motion of the hand, so that the reamer by the combined cutting and heating action turns out the bore of the blank to the precise size desired. The second tool is a revolving tapering mandrel having the exact taper of the finished bore of the blank and a heated cutting-knife, which is mounted to be readily moved toward and away from the mandrel. The blank is placed upon the mandrel and the heated cutting-knife advanced and withdrawn, it being held sufficiently long in its most advanced position to permit the mandrel, which revolves rapidly, to make at least one revolution. This tool by the combined heating and cutting action reduces the external surface of the blank to a true cylinder. The blank is then removed from the mandrel and is ready for use upon the phonograph.

By the use of the heated cutting-tools I find that the wax blanks can be cut rapidly and accurately, and that the surface of the blanks is left perfectly smooth and in good condition for receiving the sound-record and reproducing the sound therefrom. I also preferably heat the wax blanks before cutting by a hot table, oven, or chamber approximately to the temperature of the cutting-tools, so that the blanks will not crack by uneven expansion during the cutting. This is particularly necessary in the case of the reamer, since the blank comes into contact with the tool over a considerable surface. With the heated turning-off tool, however, since only the edge of the knife comes into contact with the wax, the previous heating of the blanks may be dispensed with, although it can be employed.

Any suitable forms of heated cutting-tools can be employed for the purpose, although the cutting-tools shown and described in my applications of even date herewith (Cases Nos. 769 and 770, Serial Nos. 273,039 and 273,040) are preferred by me.

My phonogram-blank being made entirely of the wax composition I employ the heated cutting-tools both upon the bore of the blank and upon its external surface; but it is evident that the invention herein is also applicable to the finishing of the external recording-surfaces of phonogram-blanks, which are composed of a wax coating upon a backing of paper or other suitable material.

What I claim as my invention is—

1. The process of finishing the wax recording-surfaces of phonogram-blanks, consisting in cutting such surfaces with heated cutting-tools, substantially as set forth.

2. The process of finishing cylindrical phonogram-blanks made entirely of wax, consisting in cutting such blanks both externally and internally with heated cutting tools, substantially as set forth.

3. The process of making cylindrical phonogram-blanks entirely of wax, consisting in first molding the hollow blanks and then cutting the blanks both externally and internally by heated cutting-tools, substantially as set forth.

This specification signed and witnessed this 28th day of April, 1888.

THOS. A. EDISON.

Witnesses:
 WILLIAM PELZER,
 A. W. KIDDLE.